Dec. 25, 1934.    J. W. TATTER    1,985,588
BRAKE
Filed April 28, 1931
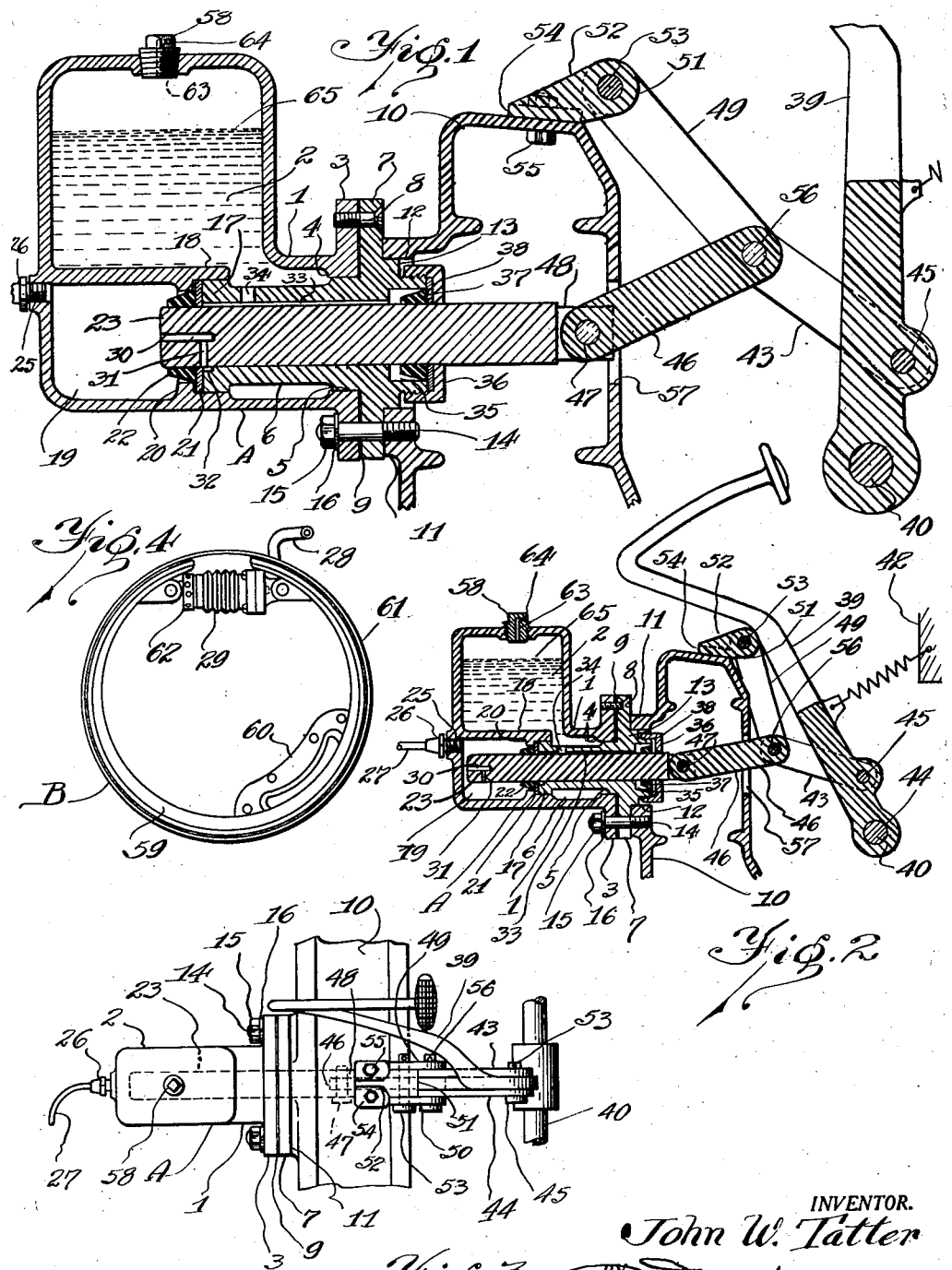
INVENTOR.
John W. Tatter
BY
ATTORNEY.

Patented Dec. 25, 1934

1,985,588

UNITED STATES PATENT OFFICE 1,985,588

BRAKE

John W. Tatter, Detroit, Mich.

Application April 28, 1931, Serial No. 533,467

11 Claims. (Cl. 60—54.6)

My invention relates to improvements in brake systems for automotive vehicles, said brakes being operated by hydraulic means; and the objects of my improvements are, first, to provide a hydraulic master cylinder for a brake system requiring no initial operative pressure therein; second, to provide a hydraulic master cylinder having no attached cylinder head; third, to provide a hydraulic master cylinder having an integral reservoir of hydraulic medium; fourth, to provide a hydraulic master cylinder with means for conducting a hydraulic medium through a piston for replenishing the hydraulic system; fifth, to provide means for developing a gradually increased pressure in a hydraulic system, said means being located on the outside of the master cylinder of the hydraulic system; sixth, to provide means for developing a gradually increased pressure in a hydraulic brake system; and seventh; to provide means for developing pressure in a hydraulic brake system, said means comprising a toggle means.

I attain these objects by the mechanism illustrated in the accompanying drawing, in which:

Figure 1 is a vertical section of the hydraulic master cylinder mounted on the housing of an engine of an automotive vehicle, together with the operating pedal and its connecting linkage in a normal or non-pressure applying position, Figure 2 is a vertical section of the hydraulic master cylinder mounted on the housing of an engine of an automotive vehicle together with its operative parts in a pressure applying position, Figure 3 is a plan elevation of the hydraulic master cylinder mounted on the housing of an engine of an automotive vehicle together with its operative parts in a pressure applying position, and Figure 4 is a side view of one of the wheel brakes of a hydraulic brake system.

Similar numerals refer to similar parts throughout the several views.

The master cylinder A comprises the housing 1 which contains the fluid reservoir 2. The housing 1 is provided with the flange 3 and the shoulder portion 4. The shoulder portion 4 is provided with a bore to engage the pilot portion 5 of the bushing member 6. The bushing member 6 is provided with a flange 7 which is suitably fastened to the flange 3 of the housing 1 by a series of screws 8 around the flange 7, the screws 8 passing through the flange 7 and threadably engaging the flange 3. A gasket 9 may be interposed between the flanges 3 and 7 to prevent leakage of the hydraulic medium from the housing 1. The housing 10, a section of the supporting housing of an engine for an automotive vehicle, may be provided with a boss 11 which in turn is provided with the bore 12 for engaging the pilot portion 13 of the bushing member 6.

A series of studs 14 may be provided for holding the housing 1 and bushing member 6 in position, the studs 14 being suitably spaced between the screws 8, the studs passing through the flanges 3 and 7 together with the gasket 9, the studs 14 being provided with the nuts 15 and washers 16.

The bushing member 6 is further provided with a pilot portion 17 which engages a bore in the boss 18, the boss 18 further enclosing the cylinder working space 19. Interposed between the end of the pilot portion 17 of the bushing member 6 and the shoulder 20 of the boss 18, is the plate 21 to which is suitably fastened the seal member 22, which is constructed of suitable resilient material such as rubber composition. The seal member 22 is provided with a wall section tapered to its free end and is initially constructed to a suitable internal size as will cause the seal member 22 to resiliently grip the piston 23, which is slidably mounted in a bore of the bushing member 6, the seal member 22 thus sealing the cylinder working space 19 against communication with the reservoir 2, as the piston 23 slidably operates through the seal member 22 and the plate 21 on its compression stroke.

The bushing member 6 is provided with the outlet passage 25 to which may be attached the connection 26 to which in turn is connected the conduit 27 to which other conduits, one of which is shown at 28 in Figure 4, may be connected to provide a complete hydraulic system, the conduit 27 being suitably connected to the hydraulic wheel cylinder 29 for operating the brake assembly B as used in the wheels (not shown) of an automotive vehicle.

The piston 23 is provided with the central passage 30 which connects with the passage 31, the passage 31 connecting with the groove 32 which extends around the piston 23 and connects with the slot 33 in the bushing member 6, the slot 33 extending longitudinally through the bushing member 6. The slot 33 is connected, with the fluid reservoir 2, by the passage or hole 34. The passages 30 and 31 together with the groove 32, the slot 33, and the passage 34 thus provide communication between the cylinder working space 19 and the fluid reservoir 2 when the piston 23 is in its normal position at the start of its pressure applying stroke as disclosed in Figure 1.

As soon as the piston 23, on its pressure applying stroke, is moved, as hereinafter described, to a point where the passage 31 is covered by the seal member 22, thus preventing further communication between the cylinder working space 19 and the fluid reservoir 2, fluid pressure will be developed in the cylinder working space 19 and throughout the connected hydraulic passages of the hydraulic system.

The slot 33 also provides communication between the fluid reservoir 2 and the clearance chamber 35 around the piston 23 at the end of the bushing member 6, thus preventing the formation of any vacuum behind the piston 23.

The bushing member 6 may be provided with threads for engaging the member 36, through which operates the piston 23. A seal member 37 is suitably fastened to the plate 38, the plate 38 being interposed between the member 36 and the end of the bushing member 6, the construction and mounting of the seal member 37 being similar to that of the seal member 22. The seal member 37 together with the plate 38 as well as the seal member 22 together with the plate 21 are similar in construction to the sealing members disclosed and originally claimed in the patent application, Serial No. 465,856 filed by applicant for Brakes on July 7, 1930.

The pedal lever 39 may be suitably mounted on the shaft 40 and the shaft 40 may be suitably supported, in a conventional way, from a clutch or engine housing (not shown) of an automotive vehicle.

The spring 41, as disclosed in Figure 2, may be suitably anchored to a member, as indicated at 42, the spring 41 being connected to the pedal lever 39, thus insuring the return of the pedal lever 39 together with its operatively connected parts, as hereinafter disclosed, together with the piston 23 to their normal or starting positions when the application of the operating pressure is removed from the pedal lever 39.

The links 43 and 44 are connected to the pedal lever 39 by the pin 45. The link 46 is connected to the piston 23 by the pin 47, the link 46 fitting between the ears 48 of the piston 23. The links 49 and 50 are connected to the boss 51 of the bracket 52 by the pin 53, the bracket 52 being provided with the flange 54 for attaching to the housing 10 by the bolts 55. The links 43 and 44 are fastened to the link 46 together with the links 49 and 50 by the pin 56.

It is to be noted that the above described link mechanism will provide a toggle joint action which will provide for the development of increased liquid pressure per square inch throughout the hydraulic brake system as the links 43 and 44 together with the link 46 are forced to the end of their movement by the pedal lever 39 and the links 49 and 50. This is readily understood from the fact that the forward movement of the pin 56 produces a relatively lesser forward movement of the piston 23, the movement of the piston 23 decreasing and the liquid pressure in the cylinder working space 19 increasing as the links 43 and 44 together with the link 46 move toward a position where said links are in line. The position of said links at the end of the pressure applying stroke is indicated in Figure 2.

It is to be noted that the housing 10 may be provided with a suitable opening 57 so that the piston 23 and its link mechanism may extend and operate therethrough.

The housing 1 may be provided with the breather plug 58 for removal when replenishing the liquid of the reservoir 2.

The breather plug 58 is provided with the passages 63 and 64 which provide atmospheric communication between the outside air and the air space above the line 65 of the liquid in the reservoir 2. Thus the braking system has no initial liquid pressure within its hydraulic system prior to the beginning of the movement of the pressure applying member of said system.

The brake assembly B comprises the brake band 59 to the ends of which is suitably connected the hydraulic wheel cylinder 29, the brake band 59 being suitably anchored by the bracket 60 which is suitably anchored to a backing plate (not shown) suitably attached to the axles of an automotive vehicle. The hydraulic wheel cylinder 29 will cause, as above disclosed, the brake band 59 to engage the internal surface of the brake drum 61. The hydraulic wheel cylinder 29 is provided with suitable adjustment means as at 62 for maintaining the brake band 59 in the proper position relative to the brake drum 61.

It is to be further noted that the variable decrease in the movement of the piston 23, which increases the effective leverage ratio of the piston operating mechanism, is accomplished with a constant angular movement of the pedal lever 39.

I claim:

1. In a hydraulic brake mechanism, the combination of a supporting housing having an opening therethrough, means suitably mounted on said supporting housing and provided with a cylinder space together with a fluid reservoir connecting with the cylinder space, a piston suitably mounted to operate in the cylinder space of said means, said piston extending through the opening of said supporting housing, an actuating lever suitably mounted on the outside of said supporting housing, a pair of links operatively connecting said piston and said actuating lever, one only of said pair of links being connected to said actuating lever, a third link pivotally mounted adjacent the outer surface of said supporting housing, said third link being located between said housing and said actuating lever, each of said pair of links being pivotally connected to said third link, said piston being moved at a decreasing rate by said links and said lever when pressure is applied to said actuating lever.

2. In a hydraulic brake system, the combination of a supporting housing, a second housing suitably mounted on one side of said supporting housing, said second housing being provided with a cylinder, a piston suitably mounted to operate in the cylinder space of said second housing, an actuating lever pivotally mounted on the outside of and oppositely disposed, relative to said supporting housing, from said housing provided with a cylinder, and means for operatively connecting said actuating lever and said piston to move said piston at a decreasing rate, said means comprising solely a pair of toggle members connecting said actuating lever and said piston, together with a third toggle member pivotally mounted on the outside of said supporting housing and pivotally connected to each of said pair of toggle members, said third toggle member exerting a thrust on said pair of toggle members to cause said piston to move at a decreasing rate when said actuating lever is pivotally moved toward said piston.

3. In a hydraulic brake system, the combination of a supporting housing, a second housing, a bushing member suitably mounted in said second housing and provided with a flanged portion extending between said supporting housing and said second housing, said second housing being provided with a cylinder space, means for securing said bushing member and said second housing to said supporting housing, a piston suitably mounted in said bushing member, a lever member mounted independently of said supporting housing, and means operatively connecting said lever member and said piston, said means moving said piston at a decreasing rate.

4. In a hydraulic brake system, the combination of a supporting housing, a second housing provided with a walled cylinder chamber together with a fluid reservoir, said second housing being provided with a pair of aligned bores, one of said aligned bores being located in the wall portion of said walled cylinder chamber, said fluid reservoir extending between said aligned bores, a bushing member suitably mounted in the aligned bores of said second housing, said bushing member and said second housing being suitably mounted on said supporting housing, a piston movably mounted in said bushing member, said piston extending into the cylinder chamber of said second housing, and means for moving said piston.

5. In a hydraulic brake system, the combination of a supporting housing, a second housing provided with a fluid reservoir and a pressure developing space together with a bore and a flange therearound, a bushing member provided with a barrel portion extending within the bore of said second housing and through a portion of said fluid reservoir, said bushing member being further provided with a flange between the flange of second housing and said supporting housing, a piston movably mounted in said bushing member and extending into the pressure developing space of said second housing, passages connecting said reservoir with said pressure developing space in said second housing, said passages extending through the barrel portion of said bushing member and through said piston, and means for operating said piston.

6. In a hydraulic brake system, the combination of a supporting housing having an opening therein, a bushing member secured to said supporting housing and extending therein, a second housing member suitably mounted on said bushing member, said second housing being provided with a pressure developing space, a piston movably mounted in said bushing member and extending into the pressure developing space of said second housing member and into said supporting housing, a lever member suitably mounted, and a plurality of link members connecting said piston and said lever member, said link members causing said piston to move at a decreasing rate.

7. In a hydraulic brake system, the combination of a supporting housing having oppositely disposed wall portions, a housing structure supported on one of the wall portions of said supporting housing, a piston movably mounted in said housing structure, said piston developing hydraulic pressure in said housing structure, a lever member independently mounted relative to said supporting housing, and a plurality of link members comprising the sole means of connecting said lever member and said piston, said link members and said piston extending through the oppositely disposed wall portions of said supported housing, said link members causing said piston to move at a decreasing rate, one of said link members being pivotally mounted on the outside of the supporting housing and further pivotally connected with the remainder of said link members at a common pivotal point.

8. In a hydraulic brake system, the combination of a supporting housing, a housing structure suitably mounted on said supporting housing, said housing structure being provided with a fluid reservoir, a cylinder space, and a bore, a piston movably mounted in the bore of said housing structure, a lever member suitably mounted, and means suitably mounted, between said supporting housing and said lever member for moving said piston at a decreasing rate, said means being pivotally connected to said supporting housing, said piston, and said lever member.

9. In a hydraulic brake system, the combination of a supporting housing having an opening therethrough, a bushing member attached to said supporting housing, a reservoir housing attached to said bushing member, a piston slidably mounted in said bushing member, a seal member clamped between said reservoir housing and said bushing member, a seal member fixedly mounted on said bushing member, said seal members surrounding said piston, a pedal lever suitably mounted adjacent said supporting housing a plurality of links pivotally connected to said pedal lever and said piston, said links being pivotally connected together, and link members pivotally connected to said first mentioned link members, said last mentioned link members being pivotally mounted on said supporting housing.

10. In a hydraulic brake system, the combination of a supporting housing provided with a bore, a bushing member provided with a bore for receiving a piston therein, said bushing member being provided further with a flange for attaching to said supporting housing, said flange surrounding said bore of said bushing member, said bushing member being provided with a pilot portion engaging the bore of said supporting housing, said bore and said pilot portion of said bushing member being in alignment with each other, a second housing provided with a pair of aligned bores for receiving said bushing member, said second housing being provided with a pressure developing chamber, said second housing being provided with a fluid reservoir extending around said bushing member between said pair of aligned bores of said second housing, said second housing being provided with a flange for attaching to the flange of said bushing member, a piston slidably mounted in the bore of said bushing member, said piston extending through said bushing member into said pressure developing chamber and also within the bore of said supporting housing, a lever, and means operatively connecting said lever and said piston to move said piston at a decreasing rate, said means being located on an oppositely disposed side of said supporting housing from said second housing and said bushing member supported thereon.

11. In a hydraulic brake system, the combination of a supporting housing, a second housing provided with a cylinder, said second housing being suitably mounted on said supporting housing, a piston movably mounted in said second housing, a lever member, independently mounted relative to said supporting housing and adapted to move towards said piston to exert a thrust thereon to develop fluid pressure, a pair of link members pivotally connected to said lever member and said piston, said pair of link members being pivotally connected to each other at a common pivot center, and a third link member pivotally to said pair of link members at the common pivot center of said pair of link members, said third link member being pivotally connected with said supporting housing.

JOHN W. TATTER.